S. HEYWOOD.
Attaching Hubs to Axles.

No. 8,015. Patented Apr. 1, 1851.

UNITED STATES PATENT OFFICE.

SIMEON HEYWOOD, OF CLAREMONT, NEW HAMPSHIRE.

CONNECTING AND DISCONNECTING WHEELS AND AXLES.

Specification of Letters Patent No. 8,015, dated April 1, 1851.

*To all whom it may concern:*

Be it known that I, SIMEON HEYWOOD, of Claremont, in the county of Sullivan and State of New Hampshire, have invented a new and useful Improvement in the Manner of Putting On and Taking Off Carriage-Wheels; and I do hereby declare that the following is a full, clear, and exact description of the construction and operation of the same, reference being had to the annexed drawings, making a part of this specification, in which—

Figure 1:
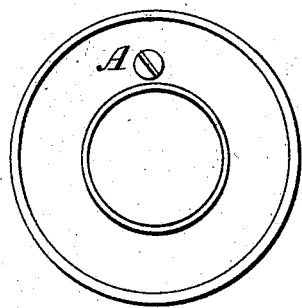
Figure 2:
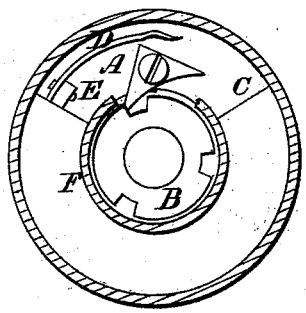
Figure 3:
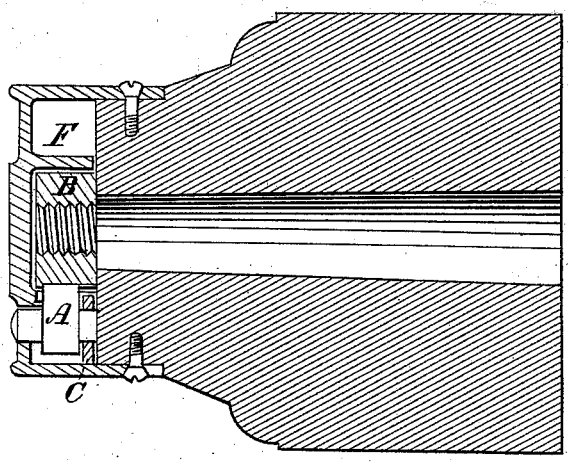
Figure 4:
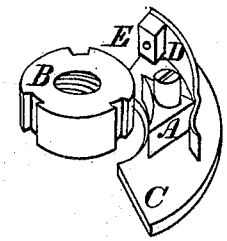

Figure 1 is the outer end view of a cast metal cap made fast to the outer end of the wheel hub and inclosing the mechanism hereafter to be described. Fig. 2 is a vertical transverse section of the same cap, taken near the outer end, and showing the mechanism made use of to put on or take off the wheel. Fig. 3 is a vertical longitudinal section of the cap and part of the hub, showing the inclosed dog and nut, and part of the axle. Fig. 4 is a perspective view of the mechanism made use of to turn the nut (which, together with the mechanism is shown disconnected from the cap and hub).

Like letters refer to like parts in all the drawings.

I use the common iron axle having a screw on the outer end and a screw nut B thereon; said nut having notches in its periphery into which the points of the triangular dog A, catch when turned in the proper direction. F, is a concentric ring cast in the cap and keeps the nut B in place.

C, is a metal plate which forms a bearing for the inner end of the dog A, and to which the spring D is made fast by means of the projection E.

The operation of the above described parts in taking off a carriage wheel secured by a right-handed screw is as follows:—The dog A, seen at A, Fig. 1 being turned from its present position slightly to the left by means of a common screw-driver will catch into one of the notches in the periphery of the nut, as seen in Fig. 2, the wheel may then be turned to the left, and thus turn off the nut. The same operations being reversed, will turn the nut on and secure the wheel. The dog A is then to be turned, by means of the screw-driver, into the position shown at A, Fig. 1, and at A, Fig. 4, when its back point will be retained by the notch in the spring D and the wheel be left free to revolve.

I do not claim the cap, the nut, or the axle, but

What I do claim as my invention, and desire to secure by Letters Patent is:

The dog and the spring combined and operating as above set forth.

SIMEON HEYWOOD.

Witnesses:
  JACOB DUNKLE,
  LUTHER BROWN.